(12) United States Patent
Barbier et al.

(10) Patent No.: US 8,791,401 B2
(45) Date of Patent: Jul. 29, 2014

(54) MATRIX IMAGING DEVICE COMPRISING AT LEAST ONE SET OF PHOTOSITES WITH MULTIPLE INTEGRATION TIMES

(75) Inventors: Frederic Barbier, Grenoble (FR); Frederic Lalanne, Bernin (FR)

(73) Assignees: STMicroelectronics (Crolles 2) SAS, Crolles (FR); STMicroelectronics SA, Montrouge (FR)

( * ) Notice: Subject to any disclaimer, the term of this patent is extended or adjusted under 35 U.S.C. 154(b) by 174 days.

(21) Appl. No.: 13/484,417

(22) Filed: May 31, 2012

(65) Prior Publication Data

US 2012/0305750 A1 Dec. 6, 2012

(30) Foreign Application Priority Data

May 31, 2011 (FR) ...................................... 11 54735

(51) Int. Cl.
*H01L 27/148* (2006.01)
(52) U.S. Cl.
USPC ..................... 250/208.1; 348/294; 348/222.1; 348/308
(58) Field of Classification Search
USPC ............. 250/208.1; 348/222.1, 294, 304, 308
See application file for complete search history.

(56) References Cited

U.S. PATENT DOCUMENTS

| 6,873,363 | B1 | 3/2005 | Barna et al. |
| 7,324,144 | B1 | 1/2008 | Koizumi |
| 2004/0041927 | A1 | 3/2004 | Cho et al. |
| 2007/0285526 | A1 | 12/2007 | Mann et al. |
| 2009/0002528 | A1 | 1/2009 | Manabe et al. |
| 2011/0075010 | A1* | 3/2011 | Border et al. ................. 348/317 |
| 2011/0234876 | A1* | 9/2011 | Leconte ....................... 348/308 |
| 2012/0257093 | A1* | 10/2012 | Sa et al. ....................... 348/302 |

FOREIGN PATENT DOCUMENTS

| EP | 2299696 A1 | 3/2011 |
| WO | 2009026311 A1 | 2/2009 |

\* cited by examiner

*Primary Examiner* — Tony Ko
(74) *Attorney, Agent, or Firm* — Allen, Dyer, Doppelt, Milbrath & Gilchrist, P.A.

(57) ABSTRACT

A method for controlling a pixel may include first and second photosites, each having a photodiode and a charge-transfer transistor, a read node, and an electronic read element, all of which are common to all the photosites. The method may include an accumulation of photogenerated charges in the photodiode of the first photosite during a first period, an accumulation of photogenerated charges in the photodiode of the second photosite during a second period shorter than the first period, a selection of the signal corresponding to the quantity of charges accumulated in the photodiode of a photosite having the highest unsaturated intensity or else a saturation signal, and a digitization of the selected signal.

26 Claims, 7 Drawing Sheets

MATRIX IMAGING DEVICE COMPRISING AT LEAST ONE SET OF PHOTOSITES WITH MULTIPLE INTEGRATION TIMES

FIELD OF THE INVENTION

The invention relates to imaging devices with a matrix network of photosites and, more particularly, with multiple photosensitivity types.

BACKGROUND OF THE INVENTION

An imaging device, or sensor, is a photosensitive electronic component used to convert an electromagnetic ray into an analog electrical signal. This signal is then amplified and digitized by an analog-digital converter and finally processed to obtain a digital image. The imaging device makes use of the photoelectric effect. An imaging device usually comprises photosites arranged in a matrix, each photosite corresponding to a pixel of an image.

A photosite comprises at least one photosensitive zone, notably a photodiode, and a zone for reading the charges accumulated in the photodiode. The photons sensed by a photodiode of a photosite are converted into electron/hole pairs. The charges of a first type, for example, the holes, created in the photosensitive zones are drained at depth to the substrate (p+), the charges of a second type, for example, the electrons, are stored in the photosite before being read by virtue of an electronic system.

Usually, this electronic system, which controls the photodiode, comprises, notably when the photodiode is a fully depleted photodiode, a transfer transistor controlling the transfer of the charges stored in the photodiode to a zone for reading charges. This zone for reading charges forms a sensing node to which is connected typical electronic read element comprising notably a read transistor.

A photodiode operates in a cycle comprising at least one integration step, a measurement step, and a reset step. The integration step corresponds to the photogeneration of charges and their accumulation during the exposure of the photodiode to light. The measurement step corresponds to the generation of a signal depending on the quantity of photogenerated charges accumulated in the photodiode. The reset step corresponds to the elimination of the photogenerated charges.

The light intensity received by a photosite corresponds to the number of photons received. The light intensity is directly proportional to the number of photons that can react with the photosensitive zone, namely the photodiode. The weaker light intensity reduces the number of incident photons.

In order to obtain a significant signal, i.e. a signal that stands out from the electronic noise, it is necessary to receive a sufficient number of photons. For a measurement to be carried out from a light ray of low intensity, the exposure time is longer than to obtain an equivalent measurement from a light ray of higher intensity.

One approach for taking a measurement under low light intensity with an imaging device with a matrix network of photosites may include taking the measurement after a relatively long integration time. However, that may require knowing the light intensity of the incident ray in advance. Specifically, when the incident ray has a relatively high intensity, the photosites of the imaging device may be saturated with charges after the integration time.

Another approach includes using an imaging device of which several photosites are coupled together in order to increase the area sensitive to the incident ray of low intensity. However, such a device may increase the size of the pixels and reduce the definition.

SUMMARY OF INVENTION

An imaging device may comprise pixels comprising photosites of different light sensitivity that may sense an unsaturated signal over a wide range of light intensity.

According to one aspect, a method for controlling a pixel that may comprise at least one first and one second photosite, each comprising a photodiode and a transfer transistor, a read node and an electronic read element all of which are common to all the photosites of the pixel.

According to a general feature, the method may comprise an accumulation of photogenerated charges in the photodiode of the first photosite during a first period, an accumulation of the photogenerated charges in the photodiode of the second photosite during a second period shorter than the first period, a selection of the signal corresponding to the quantity of charges accumulated in the photodiode of a photosite having the highest unsaturated intensity or else a saturation signal, and a post-processing of the selected signal.

By accumulating the photogenerated charges in two distinct photodiodes during two distinct integration times, and by selecting the signal of highest unsaturated intensity, the pixel comprising the two photodiodes may be sensitive to rays of relatively high intensity and rays of relatively low intensity. Specifically, if the incident ray has a relatively high intensity, after the integration time, the photodiode of the first photosite is saturated with photogenerated charges and delivers a saturated signal. The photodiode of the second photosite will be capable of delivering, on the other hand, an unsaturated signal which will then be selected by the pixel.

Conversely, for an incident ray of relatively low intensity, none of the photodiodes of the two photosites will be saturated. The selected signal may then be the signal of highest intensity. If, in an extreme case, the incident ray has an intensity that is so high that the photodiodes of the two photosites are saturated after their respective integration time, the delivered signal will be a saturation signal corresponding to a signal with an intensity that is fixed in advance.

The post-processing of the selected signal may comprise a digitization of the selected signal and a multiplication of the digitized signal at a normalization gain for the exploitation of this signal. The normalization gain may correspond to a gain making it possible to normalize the selected signal as a function of the integration time and of the photosensitive surface used for the integration. As a variant, the post-processing may also comprise a multiplication of the selected signal at a normalization gain and then a digitization.

In some embodiments, the read electronics element common to all the photosites of a pixel may comprise a reset transistor, a read transistor, and a source follower. Advantageously, the pixel may comprise at least one additional photosite comprising a photodiode and a charge-transfer transistor, and it is possible to control simultaneously and identically the gates of the charge-transfer transistors of the additional photosite and of the first photosite. By thus coupling an additional photosite to the first photosite, i.e. to the photosite dedicated to the incident rays of low intensity, the photosensitive area and thus the sensitivity of the imaging device to rays of low intensity may be increased.

The read node may be reset before the first of the signal measurements corresponding to the quantity of accumulated charges. In order to reset the read node, the gate of the reset transistor may be made to be in an on-state, i.e. it is placed at a potential that does not constitute a potential barrier with the read node, while the transfer transistors are kept in an off-state. This resetting of the read node makes it possible to dispense with any residual charge that possibly exists on the read node. Specifically, the read node may comprise compartments of a type with a first type of n+ conductivity placed in a substrate of an opposite type of conductivity such as p+. The read node thus may form semiconducting junctions PN, which remain sensitive to light despite the fact that they are silicided and can therefore integrate light. Moreover, the semiconducting junctions may form the read node and can also sense charges from neighboring photodiodes (the phenomenon called "crosstalk"). In some embodiments, each photodiode may be reset at the beginning of its charge-accumulation period.

Each photodiode may be reset at the beginning of its charge-accumulation period by imposing on the gate of the charge-transfer transistor an on-state potential and by imposing an on-state potential on the gate of the reset transistor. Thus, any residual charge may exist in the photodiode before the beginning of the accumulation period may be discharged.

In a first embodiment, the selection of the signal may comprise a measurement of the signal corresponding to the quantity of accumulated charges in the second photosite, and a comparison of the signal associated with the second photosite with a saturation threshold. The selection may include the selection of the saturation signal if the signal associated with the second photosite is above the saturation threshold. Otherwise, the selection may also comprise a measurement of the signal corresponding to the quantity of charges accumulated in the photodiode of the first photosite, a comparison of the signal associated with the first photosite with the saturation threshold, a selection of the signal associated with the second photosite if the signal associated with the first photosite is above the saturation threshold, otherwise a selection of the signal associated with the first photosite.

In another embodiment, the selection of the signal may comprise a measurement of the signal corresponding to the quantity of charges accumulated in the second photosite, a comparison of the signal associated with the second photosite with a minimal-intensity threshold, a selection of the signal associated with the second photosite if the signal associated with the second photosite is greater than the minimal-intensity threshold. Otherwise, the selection of the signal may also comprise a measurement of the signal corresponding to the quantity of charges accumulated in the first photosite, a comparison of the signal associated with the first photosite with the minimal-intensity threshold, a selection of the signal associated with the first photosite if the signal associated with the first photosite is greater than the minimal-intensity threshold, otherwise the selection of the saturation signal.

In a second embodiment, the selection of the signal may comprise a measurement of the signal corresponding to the quantity of charges accumulated in the first photosite, a comparison of the signal associated with the first photosite with a saturation threshold, a selection of the signal associated with the first photosite if the signal associated with the first photosite is below the saturation threshold. Otherwise, the selection of the signal may also comprise a measurement of the signal corresponding to the quantity of charges accumulated in the second photosite, a comparison of the signal associated with the second photosite with a saturation threshold, a selection of the signal associated with the second photosite if the signal associated with the second photosite is below the saturation threshold, otherwise it comprises the transmission of the saturation signal.

In some embodiments, a measurement of the signal corresponding to the quantity of charges accumulated in the photodiode of a photosite may comprise successively a measurement of the reference signal of the read node, a transfer of the charges accumulated in the photodiode of the photosite to the read node, and a measurement of the signal of the read node, and a determination of a subtraction of the measured signal from the reference signal. Thus, the measurement of the signal corresponding to the quantity of charges accumulated in the photodiode of a photosite may therefore be free of any variation of the reference signal of the read node. Additionally, the read node may be reset before each signal measurement associated with a photosite.

In the second embodiment, the resetting of the read node before each signal measurement associated with a photosite makes it possible to eliminate the charges of the saturated photodiode for the preceding longest integration time that would disrupt the measurement of the signal associated with the next photosite. Specifically, if the photodiode of the first photosite were saturated, the delivered signal is saturated and could give an incorrect measurement if it were added to the signal delivered by the photodiode of the second photosite. On the other hand, in the first embodiment, it is not necessary to reset the read node before each measurement of a relative signal associated with a photosite, since the signal preceding a new measurement of a relative signal associated with a photosite is not saturated.

The method may advantageously comprise an accumulation during a third period shorter than the second period of photogenerated charges in the photodiode of a third photosite also comprising a charge-transfer transistor, the selection if the signal being made on the basis of the signal associated with the first photosite, of the signal associated with the second photosite, and of the signal associated with the third photosite. Thus, by adding a third integration time associated with a third photosite, the range of light sensitivity of the imaging device may be narrowed. It is also possible to add a plurality of additional integration times associated with a plurality of additional photosites.

Another aspect is directed to an imaging device formed in a semiconductor substrate. The imaging device may comprise a matrix network formed of at least one pixel comprising at least one first and one second photosite, each comprising a photodiode and a charge-transfer transistor, a read node and an electronic read element of which are common to all the photosites of the pixel, first control means or a first controller for controlling an accumulation of photogenerated charges in the photodiode of the first photosite during a first period and an accumulation of photogenerated charges in the photodiode of the second photosite during a second period shorter than the first period, selection means or a selector for selecting the signal corresponding to the quantity of charges accumulated in the photodiode of a photosite having the highest unsaturated intensity or else a saturated signal, and means for post-processing or a processor for post-processing the selected signal.

Advantageously, the pixels may comprise at least one additional photosite comprising a photodiode and a charge-transfer transistor, the gates of the charge-transfer transistors of the additional photosite and of the first photosite being controlled simultaneously and identically. In some embodiments, the device may comprise second control means or a second controller for controlling the electronic read element common to the photosites of a pixel in order to reset the read node before the first of the signal measurements corresponding to the quantity of accumulated charges. It also may comprise a coupling of the first controller with the second controller so as to control a reset of each photodiode at the beginning of its period of charge accumulation. The selector may comprise comparison means or a comparator for comparing a signal corresponding to the quantity of charges accumulated in the photodiode of a photosite with a saturation threshold. The selector may also comprise storage means or a memory for storing a signal corresponding to the quantity of charges accumulated in the photodiode of a photosite.

The selector may comprise a measurement module for measuring the signal of the read node taking a measurement of a reference signal before the transfer of the charges from a photodiode of a photosite to the read node and for measuring after the transfer of charges, and a subtraction module for subtracting the reference signal from the measured signal. The device may also comprise a third photosite comprising a photodiode and a charge-transfer transistor, and the first controller may control an accumulation of charges in the photodiode of the third photosite during a third period shorter than the second period. The selector may select the signal on the basis of the signal associated with the first photosite, of the signal associated with the second photosite, and of the signal associated with the third photosite.

BRIEF DESCRIPTION OF THE DRAWINGS

Other advantages and features of the invention will appear on examination of the detailed description of embodiments, that are in no way limiting, and of the appended drawings in which.

DETAILED DESCRIPTION OF THE PREFERRED EMBODIMENTS

Figure 1:
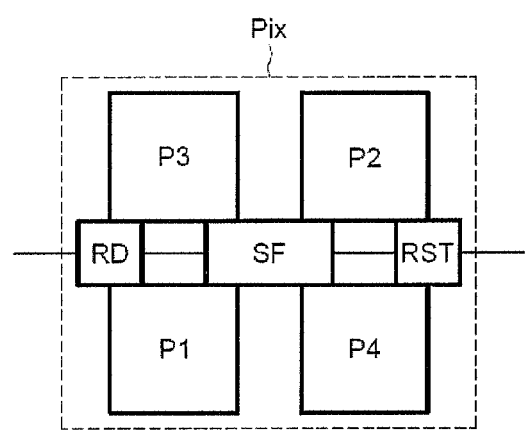
FIG. 1 is a schematic diagram of a pixel of a matrix imaging device, according to one embodiment of the present invention.

FIG. 1 shows a pixel Pix of an imaging device with a matrix network of pixels according to one embodiment of the invention. The pixel Pix in this example comprises four photosites P1 to P4, each comprising a photodiode and a charge-transfer transistor. Each photosite P1 to P4 is coupled via a common read node to a source follower SF, a reset transistor RST, and a read transistor RD, corresponding to a line-selection transistor.

Figure 2:
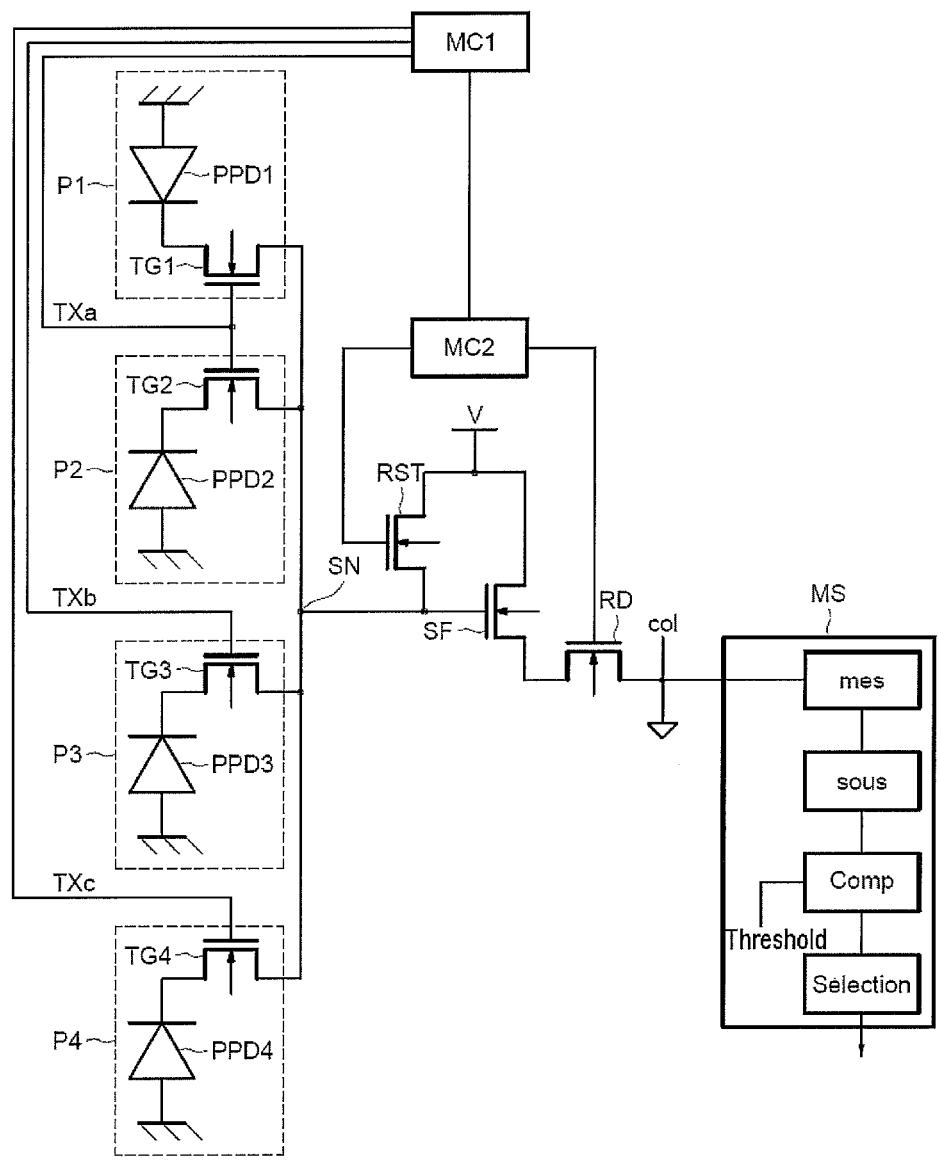
FIG. 2 shows an electronic diagram of the pixel shown in FIG. 1.

FIG. 2 represents an electronic diagram of a pixel Pix as illustrated in FIG. 1. The four photosites P1 to P4 are coupled together via the read node SN. Each photosite comprises respectively a photodiode PPD1 to PPD4 coupled to the source of a charge-transfer transistor TG1 to TG4. The drains of the transfer transistors TG1 to TG4 are coupled together and form the read node SN which is also coupled to an electronic read element common to all the photosites P1 to P4 of the pixel Pix.

The gates of the transfer transistors TG1 to TG4 are coupled to first control means or a first controller MC1. The gates of the transfer transistors TG1 and TG2 of the first and of the second photosite P1 and P2 are controlled together by a first integration control signal TXa. The gate of the transfer transistor TG3 of the third photosite P3 is controlled by a second integration control signal TXb, and the gate of the transfer transistor TG4 of the fourth photosite P4 is controlled by a third integration control signal TXc.

The first integration control signal corresponds to a long integration time to capture the incident rays of low intensity. The first and the second photosites P1 and P2 are coupled together so as to increase the sensitive area making it possible to photogenerate charges. When a measurement is taken after the first integration time, the gates of the charge-transfer transistors TG1 and TG2 of the two photosites P1 and P2 are set to an on-state potential so as to accumulate on the read node the charges accumulated in the two photodiodes PPD1 and PPD2 of the photosites P1 and P2. The second integration control signal corresponds to an average integration time for capturing incident rays of average intensity. The third integration control signal corresponds to a short integration time for capturing incident rays of high intensity.

The electronic read element comprises the reset transistor RST, the source follower SF and the read transistor RD, and is controlled by second control means or a second controller MC2. The read node SN is therefore coupled to the drain of the reset transistor RST the gate of which is coupled to the second control means MC2, and the source to a potential Vx. The read node SN is also coupled to the gate of the source follower SF. The source of the source follower SF is coupled to the potential Vx while its drain is coupled to the source of the read resistor RD. The gate of the read transistor RD is coupled to the second controller MC2, which controls the transfer of the signal received on the source of the read transistor RD to the drain of the read transistor RD, which is coupled to a column Col of the matrix network. The second controller MC2 delivers a reset control signal Reset to the gate of the reset transistor RST and a control signal Read to the gate of the read transistor RD.

In another embodiment, it is possible to have the read transistor RD and the source follower SF, which share a source and a common drain. The drain of the read transistor RD is also coupled to selection means or a selector MS. The selector comprises a measurement module MES for measuring the signal on the drain of the read transistor RD capable of taking a measurement of a reference signal before the transfer of charges from a photodiode of one photosite to the read node SN and a measurement after the transfer, a subtraction module SOUS capable of subtracting the reference signal from the measured signal, comparison means or a comparator COMP making it possible to compare a signal corresponding to the quantity of charges accumulated in the photodiode of a photosite with a threshold, and a selection module selection capable of delivering a saturation signal having a fixed intensity or the signal selected from the signals corresponding to the quantity of charges accumulated in the photodiode of the various photosites. The first and second controllers MC1 and MC2 and the selector MS can be produced from logic circuits or else by software within a microprocessor.

Figure 3:
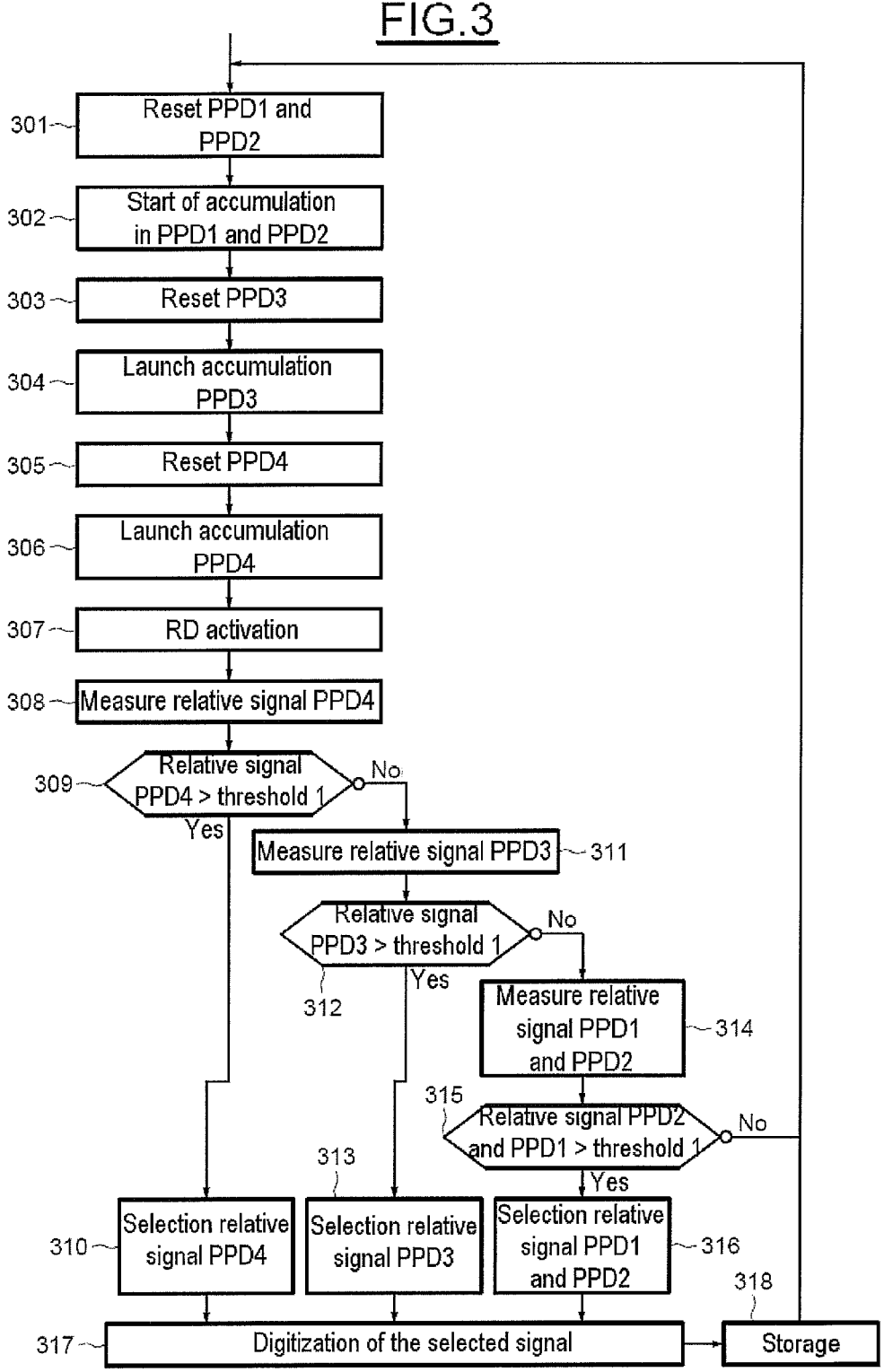
FIG. 3 is a schematic diagram of an example of a method, according to a first embodiment of the present invention.
Figure 4:
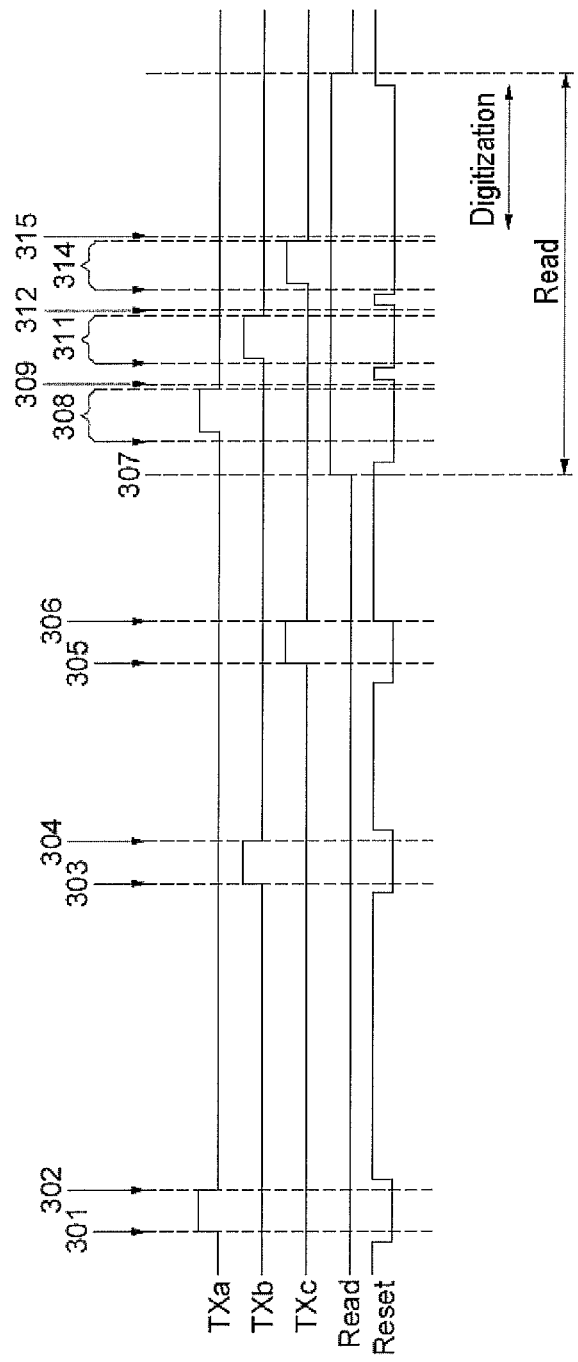
FIG. 4 shows a timing diagram of the method illustrated in FIG. 3.

FIG. 3 illustrates an example of a method for controlling a pixel as illustrated in FIGS. 1 and 2 according to a first embodiment. In a first step 301, the photodiodes PPD1 and PPD2 of the first and second photosites P1 and P2 are reset. In order to reset the photodiodes PPD1 and PPD2, the second controller MC2 imposes an off-state potential, for example, 0, on the gate of the reset transistor RST as illustrated in FIG. 4 showing a timing diagram of the method. The first controller MC1 then imposes an on-state potential, for example, 1, on the gates of the charge-transfer transistors TG1 and TG2 respectively associated with the photodiodes PPD1 and PPD2 via the integration control signal TX1 for a short time so as to transfer the charges accumulated in the photodiodes P1 and P2 to the read node SN. Once the charge-transfer transistors TG1 and TG2 are again off-state, the second controller MC2 imposes an on-state potential, for example, 1, on the gate of the reset transistor RST so as to discharge the charges from the read node SN.

After the resetting of the photodiodes PPD1 and PPD2, the accumulation of photogenerated charges in the photodiodes PPD1 and PPD2 of the first photosite and of the second photosite P1 and P2 coupled together during a first period is started in a step 302. The photodiode PPD3 of the third photosite P3 is reset in a step 303. The accumulation of photogenerated charges in the photodiode PPD3 of the third photosite P3 during a second period shorter than the first period begins in a next step 304.

The photodiode PPD4 of the fourth photosite P4 is reset in a step 305. The accumulation of photogenerated charges in the photodiode of the fourth photosite during a third period shorter than the second period begins in a next step 306. The read transistor RD is activated in a next step 307 by imposing, via the second controller MC2, an on-state potential, for example, 1, on the gate of the read transistor RD, and then, via the second controller MC2, an off-state potential, for example, 0, is imposed on the gate of the reset transistor RST.

By not turning the reset transistor RST off-state until after the activation of the read transistor RD, the charges that might have appeared on the read node SN and disrupted the measurements of the relative signals associated with the various photosites are discharged. Specifically, by turning the reset transistor RST off-state before activating the read transistor RD, and therefore the source follower SF, the read node SN would be floating. Coupling the read node SN with the column Col would modify the signal on the read node SN relative to the real number of charges present on the read node SN.

In a next step 308, the signal associated with the photodiode PPD4 of the fourth photosite P4 is measured. For this, with the aid of the measurement module MES of the selection means MS, the reference signal corresponding to the potential on the read node SN is first measured, by commanding the transfer of the signal to the source of the read transistor RD to its drain coupled to the selector, by applying an on-state potential to the gate of the read transistor RD via the second controller MC2. Then, the read transistor RD is switched off-state by applying an off-state potential to the gate of the read transistor RD with the aid of the second controller MC2, and the charges accumulated in the photodiode PPD4 of the fourth photosite P4 are transferred to the read node SN by imposing, via the first controller MC1, an on-state potential on the gate of the transfer transistor TG4. Then, with the aid of the measurement module MES, the signal on the read node is read via the activation of the read transistor RD by the second control means MC2, and the subtraction between the signal thus measured and the reference signal is carried out with the aid of the subtraction module SOUS.

In a next step 309, the signal associated with the fourth photosite P4 is compared with a minimal-intensity threshold. If the signal is greater than the minimal-intensity threshold, the signal associated with the fourth photosite P4 is selected via the selection module selection in a step 310.

Otherwise, the signal associated with the quantity of charges accumulated in the photodiode PPD3 of the third photosite P3 is measured in a step 311. Then, this relative signal is compared to the minimal-intensity threshold in a step 312. If the relative signal is greater than the minimal-intensity threshold, the signal associated with the third photosite P3 is selected in a step 313.

Otherwise, the relative signal associated with the quantity of charges accumulated in the photodiodes PPD1 and PPD2 of the first and second photosites P1 and P2 is measured in a step 314. Then, this signal is compared with the minimal-intensity threshold in a step 315. If the signal is greater than the minimal-intensity threshold, the signal associated with the first and second photosites P1 and P2 is selected in a step 316. Otherwise, the selection module selection delivers the fixed-intensity saturation signal. Once the signal has been selected in the steps 310, 313 or 316, this signal is digitized in a step 317 with the aid of the digitization means or a digitizer N, and the signal thus digitized is stored in a step 318.

Figure 5:
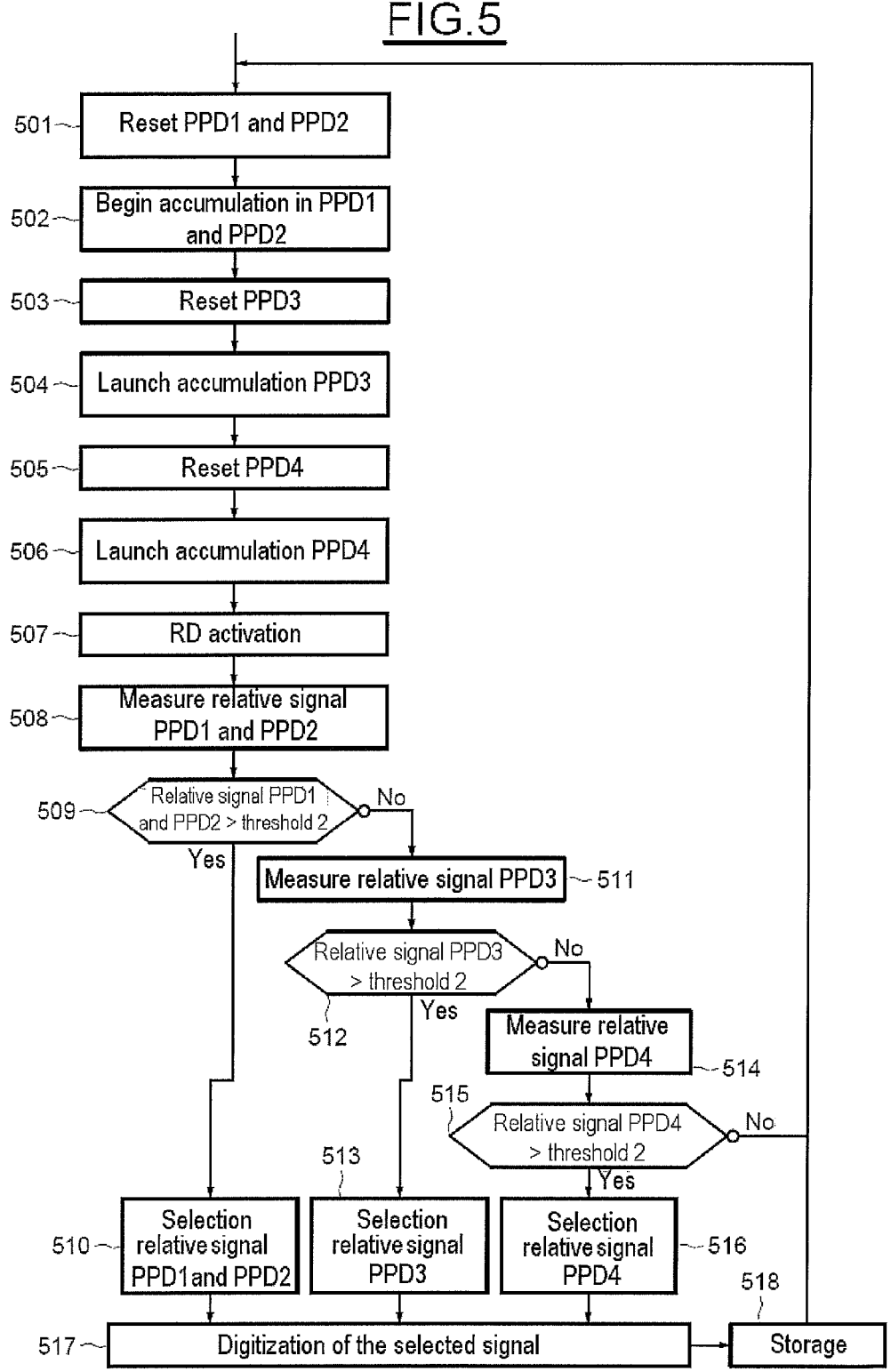
FIG. 5 is a schematic diagram of an example of the method, according to a second embodiment of the present invention.
Figure 6:
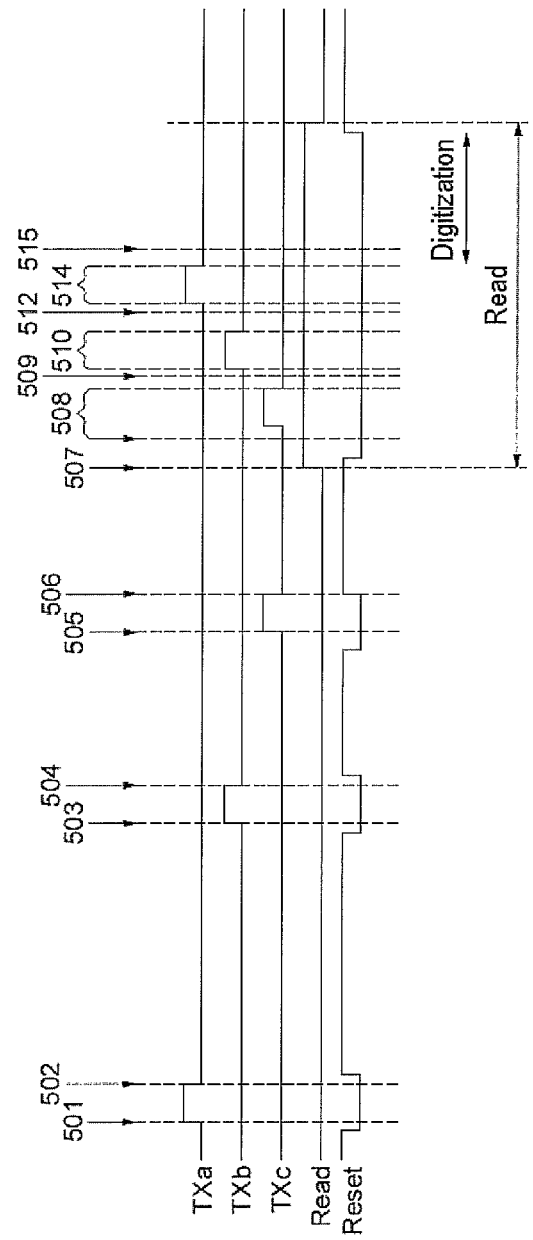
FIG. 6 shows a timing diagram of the method illustrated in FIG. 5.

FIG. 5 illustrates an example of a method for controlling a pixel as illustrated in FIGS. 1 and 2 according to a second embodiment. The steps 501 to 507 are identical to the steps 301 to 307. Thus, in a first step 501, the photodiodes PPD1 and PPD2 of the first and second photosites P1 and P2 are reset. After step 502, photogenerated charges are accumulated in the photodiodes PPD1 and PPD2 of the first photosite and of the second photosite P1 and P2 coupled together during a first period. Then, in a step 503, the photodiode PPD3 of the third photosite P3 is reset before accumulating, in a step 504, photogenerated charges in the photodiode PPD3 of the third photosite P3 during a second period shorter than the first period. In a step 505, the photodiode PPD4 of the fourth photosite P4 is reset before accumulating, in a step 506, photogenerated charges in the photodiode of the fourth photosite P4 during a third period shorter than the second period.

In a next step 507, the read transistor RD is activated by imposing an on-state potential, for example, 1, on the gate of the read transistor RD and of the source follower SF, and then an off-state potential, for example, 0, is imposed on the gate of the reset transistor RST via the second controller MC2.

In a next step 508, according to this second embodiment, the signal associated with the photodiodes PPD1 and PPD2 of the first and second photosites P1 and P2 are measured. For this, the reference signal corresponding to the potential on the read node SN is first read and then the charges accumulated in the photodiodes PPD1 and PPD2 of the first and second photosites P1 and P2 are transferred by imposing an on-state potential on the gates of the transfer transistors TG1 and TG2 via the first integration control signal TX1, and the subtraction is carried out between the signal thus measured and the reference signal.

In a next step 509, the signal associated with the first and second photosites P1 and P2 is compared with a saturation threshold. If the signal is below the saturation threshold, the signal associated with the first and second photosites P1 and P2 is selected in a step 510.

Otherwise, the signal associated with the quantity of charges accumulated in the photodiode PPD3 of the third photosite P3 is measured in a step 511. Then, this signal is compared with the saturation threshold in a step 512. If the signal is below the saturation threshold, the signal associated with the third photosite P3 is selected in a step 513.

Otherwise, the signal associated with the quantity of charges accumulated in the photodiode PPD4 of the fourth photosite P4 is measured in a step 514. Then, this signal is compared with the saturation threshold in a step 515. If the signal is below the saturation threshold, the signal associated with the fourth photosite P4 is selected in step 516. Otherwise, the selection module selection delivers the fixed-intensity saturation signal. Once the signal has been selected in the steps 510, 513 or 516, this signal is digitized in a step 517, and the signal thus digitized is stored in step 518.

The post-processing comprises the digitization of the selected signal and the multiplication of the digitized signal by a gain proportional to the integration time and to the photosensitive area, i.e. the number of photosites coupled together, and the storage of the latter. In a variant, the post-processing may comprise the multiplication of the selected signal by the gain, and then a digitization of this multiplied signal and the storage of the digitized signal.

Thus, for example, if four photosites are used in a pixel, two being dedicated to the low intensities (long integration time), one to the average intensities (average integration time) and one to the high intensities (short integration time), by taking as a reference the signal corresponding to the low intensities, the signal of the average intensities is multiplied, if it is selected, by a factor of 2 due to the difference in photosensitive area and by a factor corresponding to the ratio between the average integration time and the long integration time (for example, a factor of 10, if the long integration time is ten times longer than the average integration time). Similarly, the signal of high intensities, if it is selected, is multiplied by a factor of 2 due to the difference in photosensitive area and by a factor corresponding to the ratio between the short integration time and the long integration time (for example, a factor of 100 if the long integration time is one hundred times longer than the short integration time).

Figure 7:
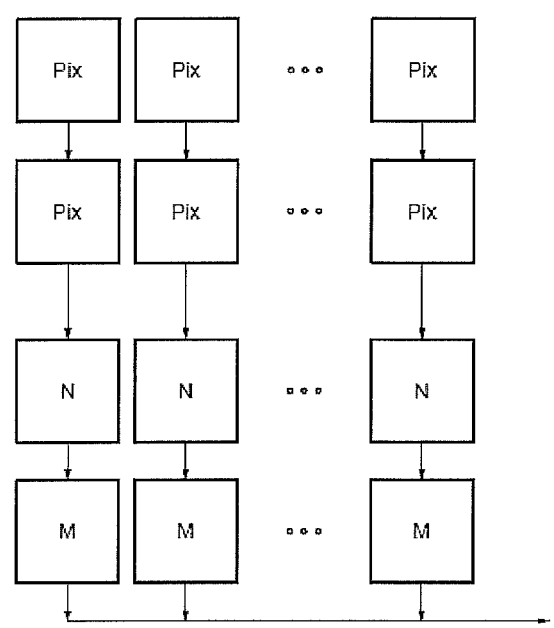
FIG. 7 is a schematic diagram of an imaging device comprising a matrix network of pixels, according to an embodiment of the present invention.

FIG. 7 represents schematically an imaging device comprising a matrix network of pixels according to one embodiment of the invention. The imaging device comprises a matrix network of pixels Pix. Each column of pixels Pix is coupled to a digitization module N, which delivers the digitized signal as an output to a memory M. The proposed imaging device comprises pixels comprising photosites of different light sensitivity in order to measure an unsaturated signal over a large range of light intensity. Moreover, each pixel is associated with one of the selectors making it possible to select a signal before digitizing it. The digitization of a signal takes significant time. Therefore, selecting one analog signal out of three and digitizing only one signal takes less time than digitizing three signals in order to select one of them following a digital comparison.

That which is claimed is:

1. A method for controlling a pixel comprising first and second photosites, a read node, and an electronic read element common to the first and second photosites and coupled to the read node, each photosite comprising a photodiode, and a charge-transfer transistor coupled thereto, the method comprising:
    accumulating photogenerated charge in the photodiode of the first photosite during a first period;
    accumulating photogenerated charge in the photodiode of the second photosite during a second period, the second period being shorter than the first period;
    selecting a signal corresponding to charge accumulated in the photodiode of one of the first and second photosites having a greatest unsaturated intensity signal, or else a saturation signal; and
    processing the selected signal.

2. The method according to claim 1 wherein the pixel comprises at least one third photosite comprising a photodiode, and a charge-transfer transistor coupled thereto; and wherein gate terminals of the charge-transfer transistors of the at least one third photosite and of the first photosite are controlled simultaneously and identically.

3. The method according to claim 1 wherein the read node is reset before a first of signal measurements corresponding to the charge accumulated.

4. The method according to claim 1 wherein each photodiode is reset at a beginning of a charge-accumulation period.

5. The method according to claim 1 wherein selecting the signal comprises:
    measuring a signal of the charge accumulated in the second photosite;
    comparing the signal of the charge accumulated in the second photosite with a saturation threshold; and
    selecting the saturation signal if the signal of the charge accumulated in the second photosite is above the saturation threshold, otherwise
        measuring a signal of the charge accumulated in the first photosite,
        comparing the signal of the charge accumulated in the first photosite with the saturation threshold, and
        selecting the signal of the charge accumulated in the second photosite if the signal of the charge accumulated in the first photosite is above the saturation threshold, otherwise selecting the signal of the charge accumulated in the first photosite.

6. The method according to claim 1 wherein selecting the signal comprises:
    measuring a signal of the charge accumulated in the first photosite;
    comparing the signal of the charge accumulated in the first photosite with a saturation threshold; and
    selecting the signal of the charge accumulated in the first photosite if the signal of the charge accumulated in the first photosite is below the saturation threshold, otherwise
        measuring a signal of the charge accumulated in the second photosite,
        comparing the signal of the charge accumulated in the second photosite with the saturation threshold, and
        selecting the signal of the charge accumulated in the second photosite if the signal of the charge accumulated in the second photosite is below the saturation threshold, otherwise selecting the saturation signal.

7. The method according to claim 6 wherein measuring the signal of charge accumulated in the first and second photosites comprises successively measuring a reference signal of the read node, transferring charge accumulated in the photodiode of a respective photosite to the read node, measuring a signal of the read node, and subtracting the signal of charge accumulated in at least one of the first and second photosites from the reference signal.

8. The method according to claim 1 wherein the read node is reset before each signal measurement associated with the first and second photosites.

9. The method according to claim 1 comprising:
    accumulating during a fourth period shorter than the second period of photogenerated charge in a photodiode of a fourth photosite, the fourth photosite also comprising a charge-transfer transistor coupled to the photodiode, the selection of the signal being based upon a signal associated with the first, second, and fourth photosites.

10. A method for reading a pixel comprising first and second photosites, each photosite comprising a photodiode, and a charge-transfer transistor coupled thereto, the method comprising:
    accumulating photogenerated charge in the photodiode of the first photosite during a first period;

accumulating photogenerated charge in the photodiode of the second photosite during a second period, the second period being shorter than the first period; and selecting a signal corresponding to charge accumulated in the photodiode of one of the first and second photosites having a greatest unsaturated intensity signal, or else a saturation signal.

11. The method according to claim 10 wherein the pixel comprises at least one third photosite comprising a photodiode, and a charge-transfer transistor coupled thereto;

and wherein gate terminals of the charge-transfer transistors of the at least one third photosite and of the first photosite are controlled simultaneously.

12. The method according to claim 10 wherein each photodiode is reset at a beginning of a charge-accumulation period.

13. The method according to claim 10 wherein selecting the signal comprises:

measuring a signal of the charge accumulated in the second photosite;

comparing the signal of the charge accumulated in the second photosite with a saturation threshold; and selecting the saturation signal if the signal of the charge accumulated in the second photosite is above the saturation threshold, otherwise measuring a signal of the charge accumulated in the first photosite, comparing the signal of the charge accumulated in the first photosite with the saturation threshold, and selecting the signal of the charge accumulated in the second photosite if the signal of the charge accumulated in the first photosite is above the saturation threshold, otherwise selecting the signal of the charge accumulated in the first photosite.

14. The method according to claim 10 wherein selecting the signal comprises:

measuring a signal of the charge accumulated in the first photosite;

comparing the signal of the charge accumulated in the first photosite with a saturation threshold; and selecting the signal of the charge accumulated in the first photosite if the signal of the charge accumulated in the first photosite is below the saturation threshold, otherwise measuring a signal of the charge accumulated in the second photosite, comparing the signal of the charge accumulated in the second photosite with the saturation threshold, and selecting the signal of the charge accumulated in the second photosite if the signal of the charge accumulated in the second photosite is below the saturation threshold, otherwise selecting the saturation signal.

15. An imaging device with an array of pixels, each pixel comprising:

first and second photosites, each comprising a photodiode, and a charge-transfer transistor coupled thereto;

a read node;

an electronic read element common to said first and second photosites and coupled to said read node;

a first controller configured to accumulate photogenerated charge in said photodiode of said first photosite during a first period, and accumulate photogenerated charge in said photodiode of said second photosite during a second period, the second period being shorter than the first period;

a selector configured to select a signal corresponding to charge accumulated in said photodiode of a photosite having a greatest unsaturated intensity signal, or else a saturated signal; and a processor configured to process the selected signal.

16. The imaging device according to claim 15 wherein each pixel further comprises at least one third photosite comprising a photodiode, and a charge-transfer transistor coupled thereto; and wherein each charge-transfer transistor of said first and at least one third photosites comprises a control terminal configured to be controlled simultaneously and identically.

17. The imaging device according to claim 15 wherein each pixel further comprises a second controller configured to control said electronic read element to reset said read node before a signal measurement corresponding to charge accumulated.

18. The imaging device according to claim 17 wherein said first controller is coupled to said second controller, each controller configured to respectively control a reset of each photodiode at a beginning of the first and second periods.

19. The imaging device according to claim 15 wherein said selector comprises a comparator configured to compare a signal corresponding to charge accumulated in said photodiodes of said first and second photosites with a saturation threshold.

20. The imaging device according to claim 19 wherein said selector comprises a memory configured to store the signal corresponding to the charge accumulated in said photodiodes.

21. The imaging device according to claim 15 wherein said selector comprises:

a measurement module configured to measure a signal of said read node, measure of a reference signal before transfer of charge from a respective photodiode of said first and second photosites to said read node, and measure a signal after the transfer of charge; and a subtraction module configured to subtract the reference signal from the measured signal.

22. The imaging device according to claim 15 wherein each pixel further comprises a fourth photosite comprising a photodiode, and a charge-transfer transistor coupled thereto; wherein said first controller is configured to control an accumulation of charge in said photodiode of said fourth photosite during a fourth period shorter than the second period; and wherein said selector is configured to select the signal based upon the signal associated with said first, second, and fourth photosites.

23. An imaging device with an array of pixels, each pixel comprising:

first and second photosites, each comprising a photodiode, and a charge-transfer transistor coupled thereto; and a controller configured to accumulate photogenerated charge in said photodiode of said first photosite during a first period, accumulate photogenerated charge in said photodiode of said second photosite during a second period, the second period being shorter than the first period, and select a signal corresponding to charge accumulated in said photodiode of a photosite having a greatest unsaturated intensity signal, or else a saturated signal.

24. The imaging device according to claim 23 wherein each pixel further comprises a third photosite comprising a photodiode, and a charge-transfer transistor coupled thereto; and wherein each charge-transfer transistor of said first and third photosites comprises a control terminal configured to be controlled simultaneously.

25. The imaging device according to claim 23 wherein said controller is configured to select the signal by at least:
- measuring a signal of the charge accumulated in the second photosite;
- comparing the signal of the charge accumulated in the second photosite with a saturation threshold; and
- selecting the saturation signal if the signal of the charge accumulated in the second photosite is above the saturation threshold, otherwise
  - measuring a signal of the charge accumulated in the first photosite,
  - comparing the signal of the charge accumulated in the first photosite with the saturation threshold, and
  - selecting the signal of the charge accumulated in the second photosite if the signal of the charge accumulated in the first photosite is above the saturation threshold, otherwise selecting the signal of the charge accumulated in the first photosite.

26. The imaging device according to claim 23 wherein said controller is configured to select the signal by at least:
- measuring a signal of the charge accumulated in the first photosite;
- comparing the signal of the charge accumulated in the first photosite with a saturation threshold; and
- selecting the signal of the charge accumulated in the first photosite if the signal of the charge accumulated in the first photosite is below the saturation threshold, otherwise
  - measuring a signal of the charge accumulated in the second photosite,
  - comparing the signal of the charge accumulated in the second photosite with the saturation threshold, and
  - selecting the signal of the charge accumulated in the second photosite if the signal of the charge accumulated in the second photosite is below the saturation threshold, otherwise selecting the saturation signal.

* * * * *